(12) United States Patent
Alzoubi et al.

(10) Patent No.: US 6,839,541 B2
(45) Date of Patent: Jan. 4, 2005

(54) TECHNIQUE FOR ESTABLISHING A VIRTUAL BACKBONE IN AN AD HOC WIRELESS NETWORK

(75) Inventors: Khaled Muhyeddin M. Alzoubi, Orland Park, IL (US); Peng-Jun Wan, Chicago, IL (US); Ophir Frieder, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 478 days.

(21) Appl. No.: 10/006,943

(22) Filed: Dec. 4, 2001

(65) Prior Publication Data

US 2003/0104829 A1 Jun. 5, 2003

(51) Int. Cl.⁷ .................................................. H04B 5/00
(52) U.S. Cl. .................. 455/41.2; 455/517; 455/426.2; 370/338; 370/408
(58) Field of Search .............................. 455/41.1, 41.2, 455/41.3, 500, 517, 519, 445, 426.1; 370/347, 466, 254, 349, 338, 328, 408, 401, 352, 356

(56) References Cited

U.S. PATENT DOCUMENTS

| | | | |
|---|---|---|---|
| 5,412,654 A | | 5/1995 | Perkins |
| 5,436,905 A | | 7/1995 | Li et al. |
| 5,533,025 A | | 7/1996 | Fleek et al. |
| 5,623,495 A | | 4/1997 | Eng et al. |
| 5,654,959 A | * | 8/1997 | Baker et al. ................. 370/331 |
| 5,706,428 A | | 1/1998 | Boer et al. |
| 5,717,689 A | | 2/1998 | Ayanoglu |
| 5,875,179 A | | 2/1999 | Tikalsky |
| 5,987,011 A | * | 11/1999 | Toh ............................ 370/331 |
| 6,078,568 A | | 6/2000 | Wright et al. |
| 6,104,712 A | | 8/2000 | Robert et al. |
| 6,122,759 A | | 9/2000 | Ayanoglu et al. |
| 6,130,881 A | | 10/2000 | Stiller et al. |
| 6,195,751 B1 | | 2/2001 | Caronni et al. |
| 6,198,728 B1 | | 3/2001 | Hulyalkar et al. |
| 6,205,128 B1 | | 3/2001 | Le |
| 6,304,556 B1 | * | 10/2001 | Haas ........................... 370/254 |
| 6,456,599 B1 | * | 9/2002 | Elliott ......................... 370/254 |
| 2002/0018448 A1 | * | 2/2002 | Amis et al. .................. 370/255 |

OTHER PUBLICATIONS

I. Cidon and O. Mokryn: *Propagation and Leader Election in Multihop Broadcast Environment*, 12th International Symposium on DIStributed Computing (DISC98), 104–119, Greece, Sep. 1998.

(List continued on next page.)

*Primary Examiner*—Tilahun Gesesse
(74) *Attorney, Agent, or Firm*—Pauley Petersen & Erickson

(57) ABSTRACT

An algorithm on a computer readable medium for efficiently creating a message efficient virtual backbone in a wireless ad hoc network utilizes three phases to establish an efficient network among the independent transceivers of a wireless ad hoc network. Independent transceivers within the transmission range of each other are neighbors. A leader election and tree construction phase constructs a tree of neighboring transceivers with one transceiver being designated the root and with each transceiver establishing and recording its location in the tree structure and the identifiers of its neighbors; and reporting when the tree is established. A level calculation phase determines the level of each transceiver away from the root transceiver, with each transceiver recording the level of its neighbors. Precedence for each transceiver is established with consideration of each transceiver's tree level and identifier, with tree level being paramount in deciding precedence; and reporting when the levels of the tree are established. A backbone construction phase establishes all transceivers as a dominator or a dominatee, with the dominators forming the network backbone and the dominatees all being neighbors to a dominator. Within the network each transceiver only needs to know the information of its neighboring transceivers.

5 Claims, 3 Drawing Sheets

OTHER PUBLICATIONS

P. Berman et al.: *Applications of the Matroid Parity Problem to Approximating Steiner Trees*, Tech. Rep. 980021, Computer Science Dept., UCLA, 1998.

H.B. Hunt et al.: *NC–Approximation Schemes for NP– and PSPACE–Hard Problems for Geometric Graphs, Journal of Algorithms*, 26(2):238–274, 1998.

B. Das et al.: *Routing in Ad Hoc Networks Using a Spine*, International Conference on Computers and Communications Networks '97, Las Vegas, Nevada, Sep. 1997.

U. Feige: *A threshold of 1n n for approximating set cover*, 28th ACM Symposium on Theory of Computing, 314–318, 1996.

S. Guha et al.: *Approximation Algorithms for Connected Dominating Sets, Algorithmica*, 20(4):374–387, Apr. 1998.

M.V. Marathe et al.: *Simple Heuristics for Unit Disk Graphs, Networks*, vol. 25, 59–68, 1995.

K. M. Alzoubi et al.: *New Distributed Algorithm for Connected Dominating Set in Wireless Ad Hoc Networks*, Proceedings of the 35th Hawaii International Conference on System Sciences—2002.

B. Das et al.: *Routing in Ad–Hoc Networks Using Minimum Connected Dominating Sets*, International Conference on Communications '97, Montreal, Canada, Jun. 1997.

K. M. Alzoubi et al.: *Distributed Heuristics for Connected Dominating Sets in Wireless Ad Hoc Networks, Journal of Communications and Networks*, vol. 4, No. 1, Mar. 2002.

\* cited by examiner

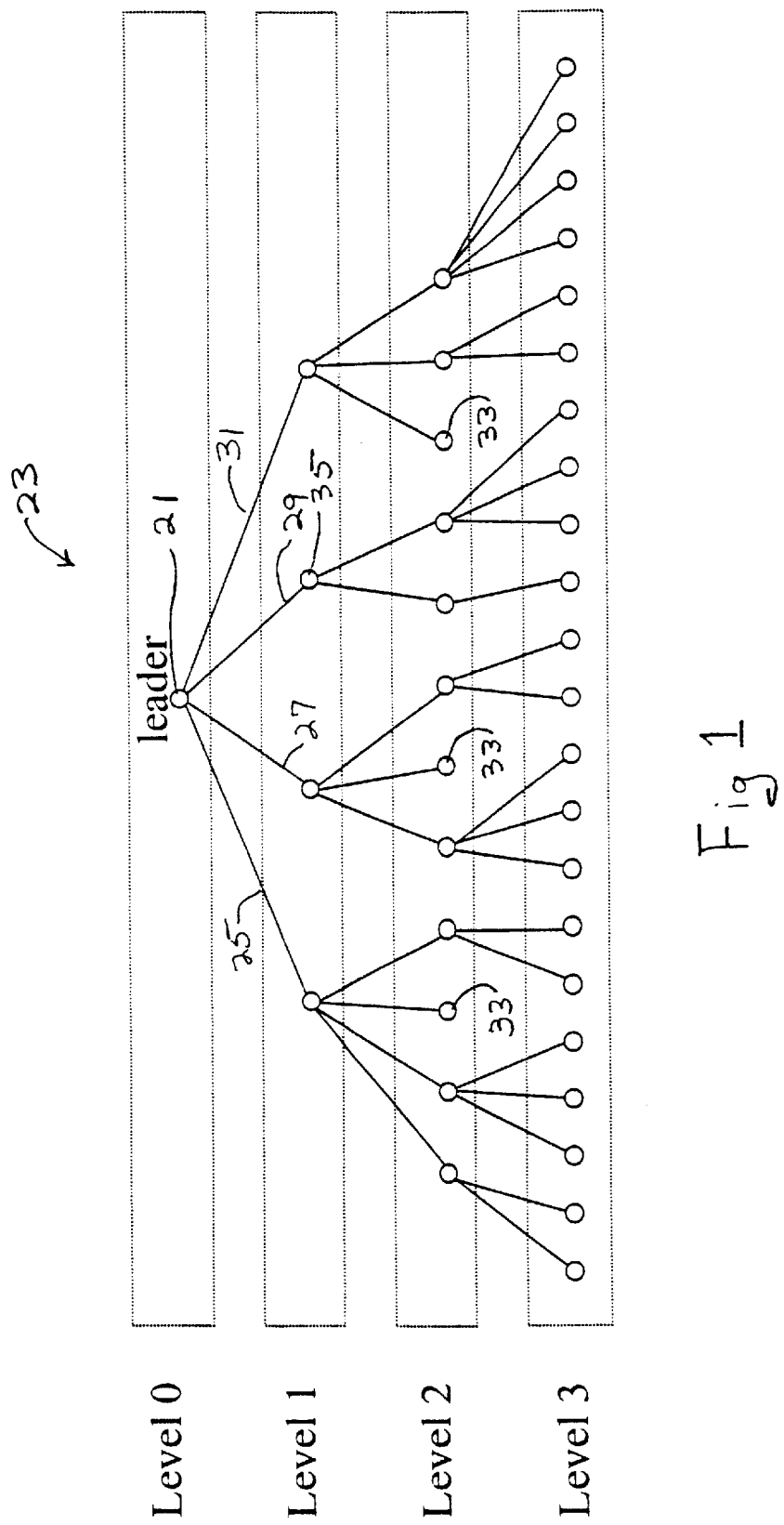

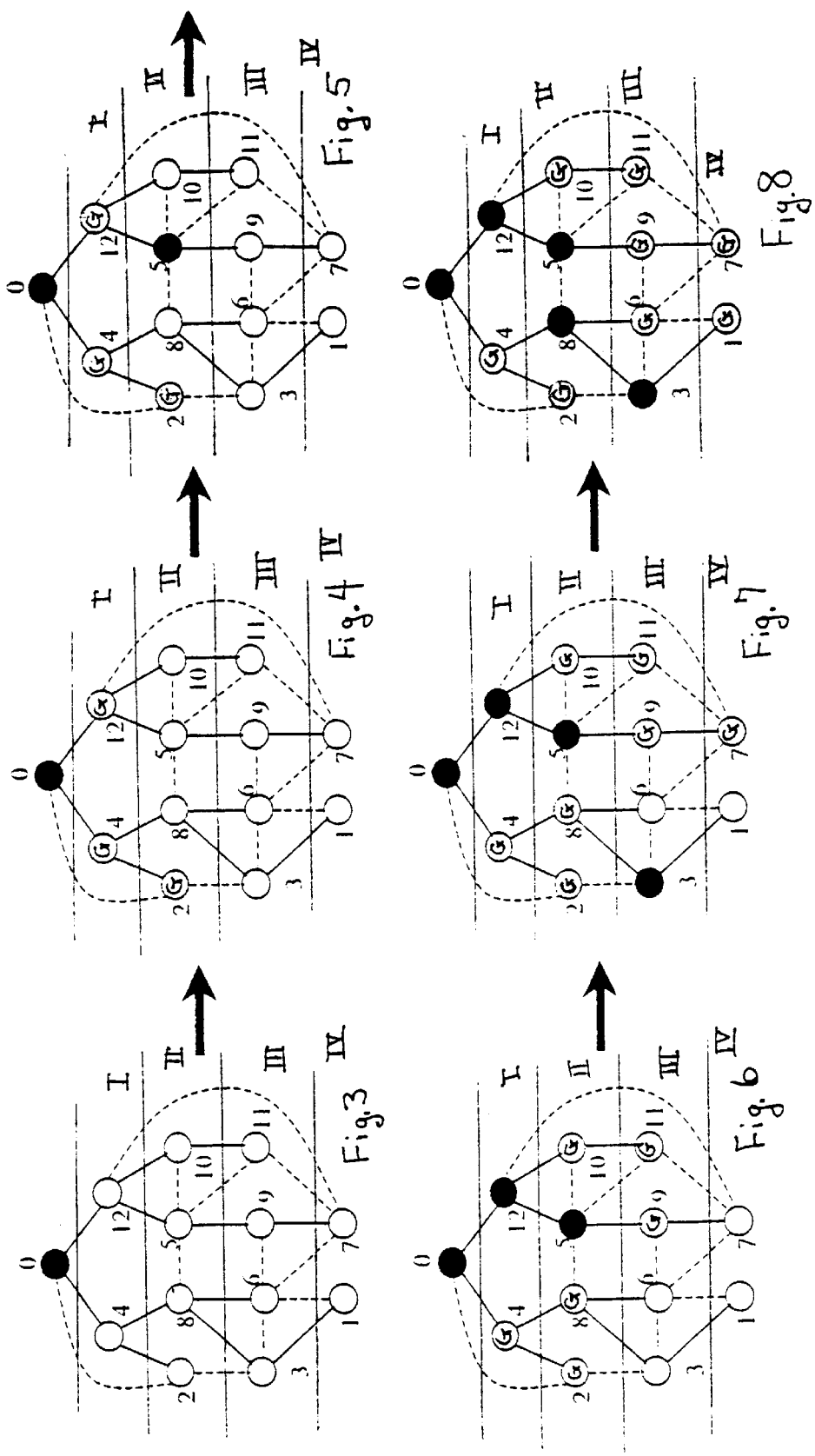

TECHNIQUE FOR ESTABLISHING A VIRTUAL BACKBONE IN AN AD HOC WIRELESS NETWORK

BACKGROUND OF THE INVENTION

An ad hoc wireless network is constructed from independent wireless transceivers communicating between each other without benefit of other infrastructure. Thus, ad hoc wireless networks are unlike wired or even cellular networks that require a physical infrastructure. Wired environments require the placing of cables. Cellular networks require the availability of base stations to support communications. For example, an ad hoc wireless network environment may comprise a group of transceivers carried by people randomly dispersed over a geographic area. Each transceiver has a limited range of transmission and reception. A "neighbor" or "neighboring" transceiver is defined herein as one within the transmission range of a given transceiver, i.e., neighbors are able to directly communicate. Networks must be created to allow the networked transceivers to communicate between non-neighboring transceivers through intermediate neighboring transceivers.

In ad hoc environments such as emergency relief or battlefield deployments, the reliance on either wired or cellular networks is often not desired or possible. Thus, although the lack of a required physical infrastructure makes ad hoc networks seem appealing, this lack of physical infrastructure imposes several difficulties. Since there is no physical infrastructure, each communicating device, or transceiver, must support all of its physical needs, e.g., power, as well as its logical needs, e.g., a message routing backbone. Setting up this backbone is a must to guarantee efficient networked communication among the communicating parties. Since all resources are at a premium, the goal of any constructed ad hoc network must be that the network is efficient, i.e., communication between two particular transceivers involves as few nodes, i.e., transceivers, as possible. Further, creation of the ad hoc network backbone by message traffic among the transceivers must be done efficiently, i.e., with a minimum amount of message traffic to establish the ad hoc network backbone. Further, message length itself is desirably kept to a minimum.

Prior attempts have not established optimal efficiency with regard to the creation and operation of an ad hoc wireless network. Prior approaches generally require each transceiver to have "two-hop neighborhood" information, i.e., each transceiver must obtain, retain, and communicate information regarding a neighbor and the next level transceiver adjacent to that neighbor. Thus a far higher number of messages, each of which are lengthier in size, is required to set up and to operate the network. Also, prior approaches have required a larger than theoretically order optimal backbone network without providing any additional benefit, and thereby introduced additional resource burdens on each transceiver.

SUMMARY OF THE INVENTION

The techniques of the present invention develop an efficient ad hoc wireless network backbone using a minimal number of very short messages. In a first aspect, the present invention is an algorithm for dynamically constructing a communication backbone of small size for ad hoc wireless networks. For arbitrary ad hoc networks, this algorithm is message complexity optimal, in other words, the creation of a communication backbone in an ad hoc wireless environment cannot be accomplished in a theoretically fewer number of messages in terms of the order of number of nodes participating in the network. This algorithm is distributed in nature and requires only that each transceiver have information concerning its neighbors, also sometimes referred to as a "single-hop" scenario. The information of the neighbors may include, e.g., ID number and level number. Therefore, the message length can be quite short. The fewer and shorter the messages are, the lower is the resource burden on each transceiver, and hence, the better is the efficiency of the transceivers.

According to another aspect of the present invention, an algorithm is presented for establishing an ad hoc wireless network backbone from a set of independent transceivers, each having a unique identifier, or ID. The algorithm may be distributed across each of the independent transceivers. The algorithm may comprise three phases. Phases 1 and 2 may generally impose a logical structure on the randomly distributed transceivers, while phase 3 will then construct a network backbone. Phase one, or the leader election and tree construction phase, uses arbitrary leader selection and tree construction methods as now known or later developed in the art. In this first phase, the tree is constructed with one transceiver being designated the root and with each transceiver establishing and recording its location in the tree structure and the presence and identifiers of its neighbors. A reporting function may be provided for announcing when the tree is established to signal the next phase of the algorithm.

A second, level calculation phase proceeds from the first phase, beginning when the root transceiver of the tree announces its level (0). The level increases for each transceiver as its distance from the root increases, with each transceiver recording each of its neighbor's level. After each transceiver's level is established, a precedence, or rank, for each transceiver is established by consideration of each transceiver's level and ID, with level being paramount in deciding precedence. A reporting function may be provided when the levels of the tree are established to signal the next phase of the algorithm.

A third, backbone construction, phase proceeds after completion of the second, level calculation, phase. In the third phase, all transceivers start as neutral and are subsequently designated as a dominator or a dominatee, with each transceiver sending one of two status messages: a dominator message or a dominates message, each status message containing the sender's identifier. It will be noted that each transceiver already knows the level designation of its neighbors.

In the backbone construction phase, the root transceiver (level 0) declares itself a dominator and sends a dominator message, which by definition is received by its neighbors. All other transceivers subsequently act according to the following three principles: 1) a neutral transceiver receiving a dominator message for the first time shall mark itself a dominates and broadcast a dominatee message, 2) a neutral transceiver receiving a dominatee message from all of its neighbors of lower precedence (i.e., in a lower numbered level thus closer to the root on the tree, or a lower ID in same level) shall mark itself a dominator and broadcast a dominator message; and 3) a dominatee transceiver receiving a dominator message from a child (in terms of the tree) transceiver's first transmission shall remark itself a dominator and broadcast a dominator message. It will be appreciated that degrees of precedence are ordinal, i.e., 0, 1, 2, 3, etc., and thus, given any two transceivers, the transceiver with a higher precedence is either further away from the root of the tree or at the same distance from the root but with a higher transceiver number.

At the end of the backbone construction each transceiver is designated either a dominator or a dominatee, and the root transceiver may be notified of completion of the ad hoc network backbone. All the nodes marked as dominators form the backbone of the ad hoc network. It will be noted that, according to the above algorithm, each transceiver only needs to know the level and identifier information of its neighboring transceivers, a so-called one-hop network scenario.

DETAILED DESCRIPTION OF THE PRESENTLY PREFERRED EMBODIMENTS

A distributed algorithm for building wireless ad hoc network backbones according to the present invention generally includes three phases: the first, leader election phase, the second, level calculation phase, and the third, backbone construction, phase.

Figure 1:
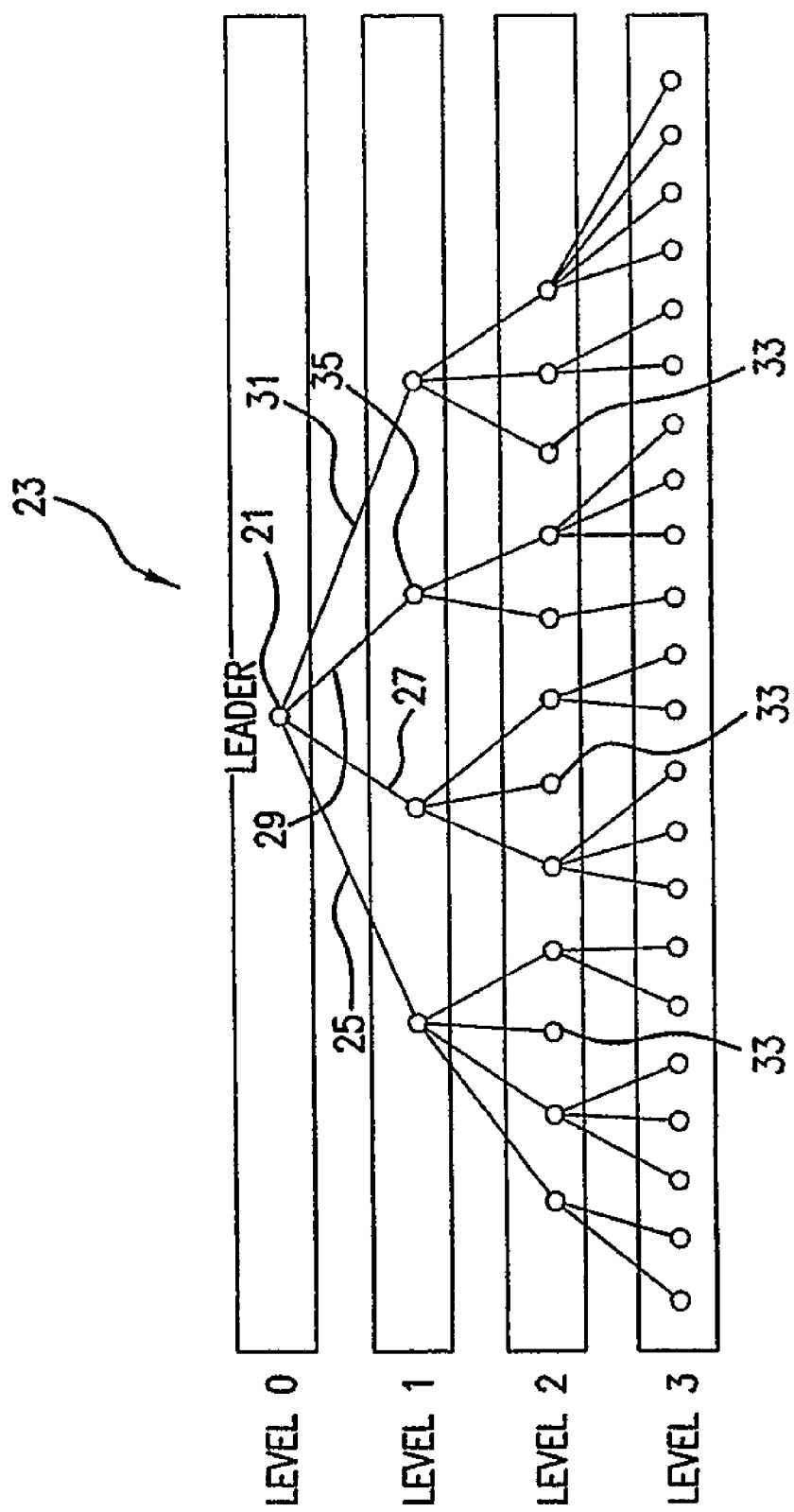
FIG. 1 illustrates a spanning tree organizing the transceivers at various levels.
Figure 2:
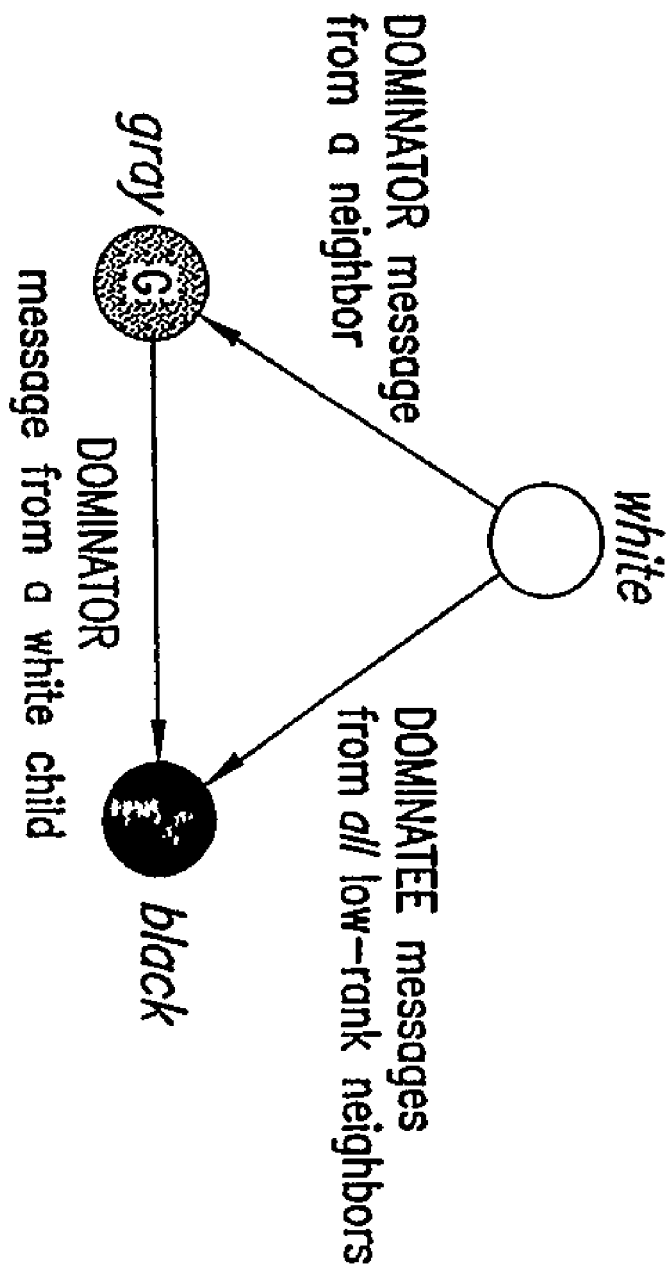

Referencing FIG. 1, among the transceivers, shown as circles, the leader election and tree construction phase elects a leader transceiver 21 and constructs a spanning tree 23 of the transceivers, according to techniques as now or hereafter known in the art. The spanning tree 23 is rooted at the leader transceiver 21, thus "root" and "leader" may be used synonymously hereinafter. A distributed algorithm for leader election as known in the art, such as, e.g., is disclosed in I. Cidon and O. Mokryn, *Propagation and Leader Election in Multihop Broadcast Environment,* 12th International Symposium on Distributed Computing (DISC98), pp. 104–119, September 1998, Greece. can be adopted. Note that any criteria can be used to define the leadership and the referenced method is not meant to limit the present invention. At the end of the first phase, i.e., completion of tree construction, each transceiver knows its parent and any children in the tree, i.e., the transceiver closer to, and farther away from, the root on a branch, respectively.

For example, in FIG. 1, four primary branches 25, 27, 29, and 31 extend from the root 21. The four primary branches have 4, 3, 2 and 3 secondary branches, respectively. One secondary branch in each of primary branches 25, 27 and 31 ends as a leaf, i.e., the farthest extension of a branch, collectively indicated as 33.

In the Level Calculation Phase, each transceiver identifies its level in the tree 23. The Level Calculation Phase starts with the root 21 announcing its level, 0. Each transceiver, upon receiving the level announcement message from its parent in the tree, obtains its own level by increasing the level of its parent by one, and then announcing, or broadcasting, its own level. As shown in the tree of FIG. 1, four levels, from 0 to 3 are established. It will be noted that level three, the last or highest level, consists entirely of leaves. Each transceiver records the levels of its neighbors.

If a tree completion report is desired, a report process can be performed along the tree 23 from leaf, e.g., 33, to root 21. When a leaf transceiver has determined its level, it transmits a COMPLETE message to its parent. Each internal transceiver, i.e., those transceivers between the root and the leaf on a branch, e.g., 35, will wait until it receives this COMPLETE message from each of its children and then forward it up the tree 23 toward the root 21. When the root 21 receives the COMPLETE message from all its children, the algorithm may start the third phase.

The total number of messages sent in this phase is minimal in terms of the order of number of nodes participating in the network. At the completion of the first two phases, each transceiver knows its own and its neighbors' levels and IDs. The paired data of the level and ID of a transceiver defines the rank, or precedence, of this transceiver. The ranks, or degrees of precedence, of all transceivers are determined first by order of level and then according to ID within each level. Thus the leader, which is at level 0, and, in our example but not necessarily, ID 0, has the lowest rank and lowest, or beginning, precedence.

Figure 2:
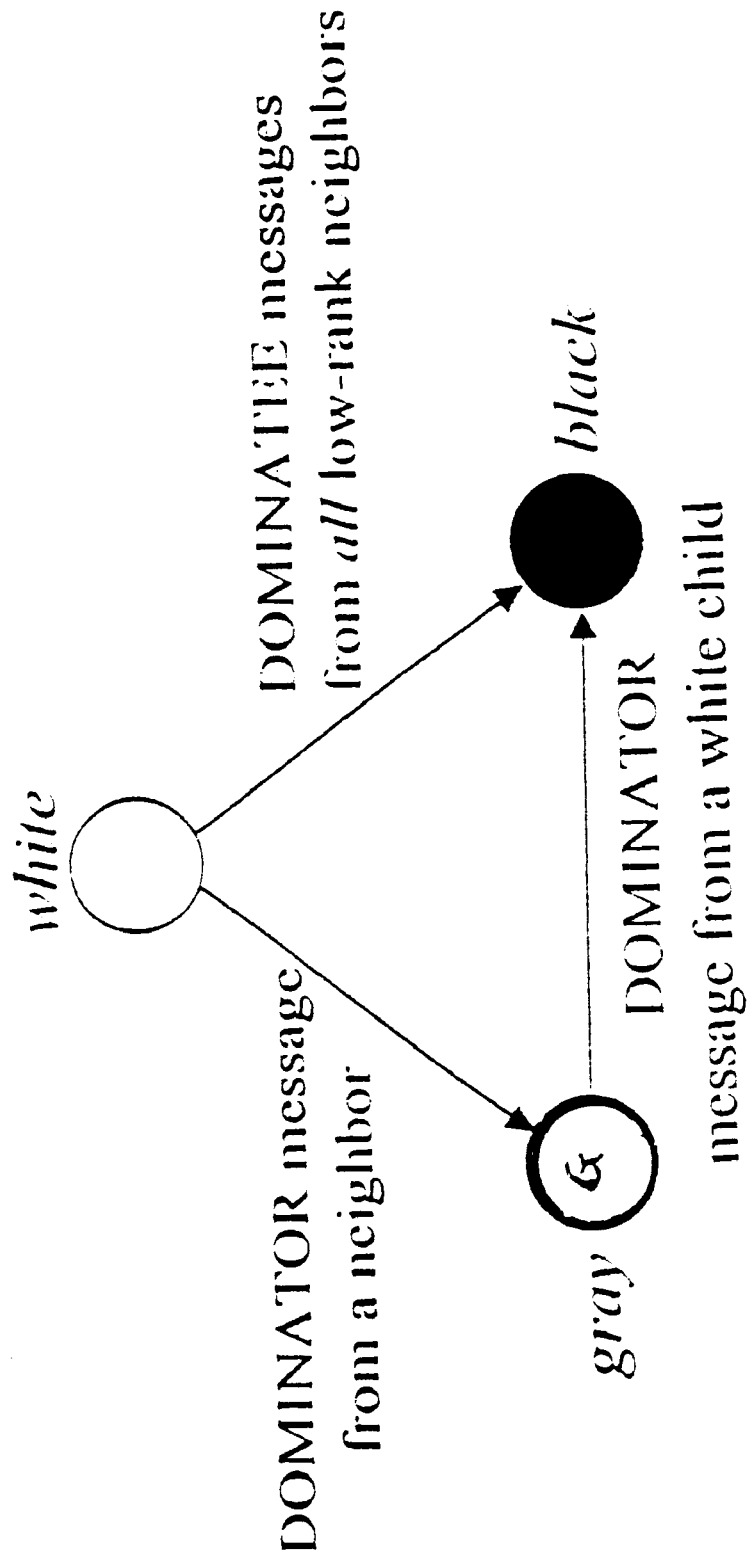
FIG. 2 shows the state diagram for the backbone construction phase of the present invention.

In the third, backbone construction, phase, all transceivers are initially unmarked (white), and will eventually get marked either black, or gray as indicated with a "G". That is, the transceivers are initially neutral, i.e., white, and will become either a dominator, i.e., black, or a dominatee, i.e., gray. FIG. 2 shows the state transition diagram of this third phase. Two types of messages are used by the transceivers during this phase, the DOMINATOR message and the DOMINATEE message. The DOMINATOR message is sent by a transceiver after it marks itself black, and the DOMINATEE message is sent by a transceiver after it marks itself gray. Both messages contain the sender's ID.

The backbone construction phase is initiated by the root that marks itself black, and then broadcasts to its neighbors a DOMINATOR message. All other transceivers act according to the following principles. Whenever a white transceiver receives a DOMINATOR message for the first time, it marks itself gray and broadcasts the DOMINATEE message. When a white transceiver has received a DOMINATEE message from each of its neighbors of lower rank, it marks itself black and broadcasts the DOMINATOR message. When a gray transceiver receives a DOMINATOR message from some white child, it remarks itself black and broadcasts the DOMINATOR message. A reporting process similar to the second phase, can be performed if desired to notify the root of the completion of all transceivers being marked.

FIGS. 3–8 illustrate a technique for establishing the network backbone in the third phase of the algorithm. This process will be illustrated and explained in color marking terms, although it will be appreciated that no extra data need be introduced to the message stream in association with this "color marking". In FIGS. 3–8, the IDs of the transceivers are labeled beside the transceivers, and the transceiver 0 is the leader, or root, elected in the first phase of the algorithm. The solid lines represent the logical and direct connections of the spanning tree constructed at the first phase, and the dashed lines represent communication paths between transceivers that are not in the lineal path, or branch structure, of the spanning tree. Levels beyond the root are indicated to the right of the figures in Roman numerals. The ordering of the transceivers by rank is given by 0 (level 0); 4, 12, (level I); 2, 5, 8, 10, (level II); 3, 6, 9, 11, (level III); 1, 7 (level IV). A possible execution scenario is shown in FIGS. 3–8 as explained below.

Figure 3:
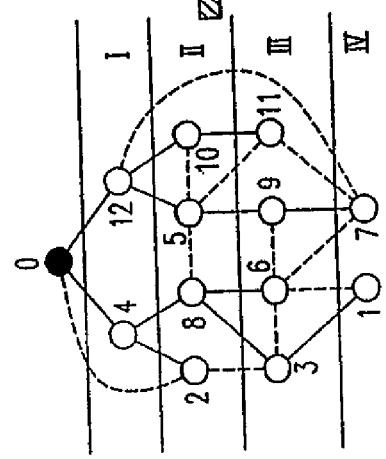
FIGS. 3–8 illustrate the process of the backbone construction phase according to the present invention.

Referencing FIG. 3, transceiver 0, the root, marks itself black and sends out a DOMINATOR message.

Figure 4:
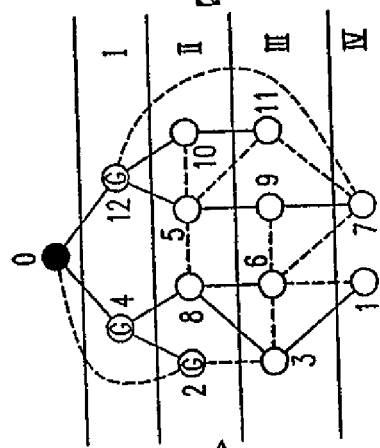

Referencing FIG. 4, upon receiving the DOMINATOR message from transceiver 0, transceivers 2, 4, and 12 mark themselves gray, and then send out the DOMINATEE messages.

Figure 5:
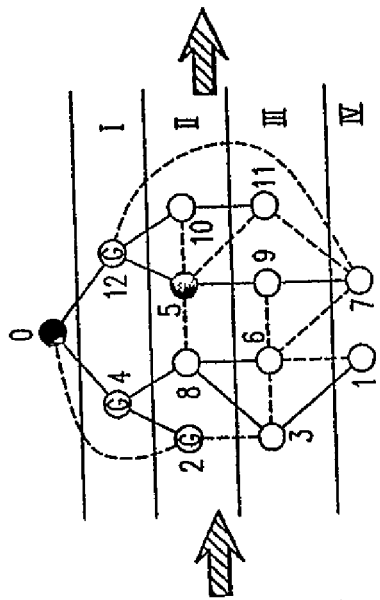

Referencing FIG. 5, upon receiving the DOMINATEE message from transceiver 2, transceiver 3 has to wait for transceiver 8. Upon receiving the DOMINATEE message from transceiver 4, transceiver 8 has to wait for transceiver 5. Upon receiving the DOMINATEE message from transceiver 12, transceiver 5 marks itself black as all its low-ranked neighbors (transceiver 12 only) have been marked gray; transceiver 7 has to wait for transceivers 6, 9, 11; and transceiver 10 has to wait for transceiver 5.

Figure 6:
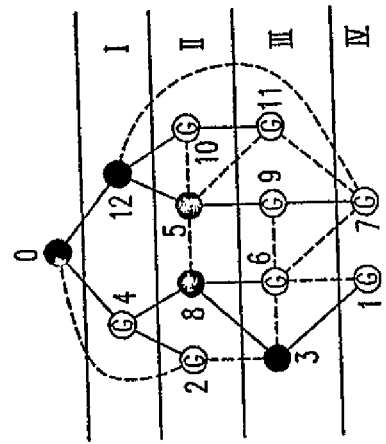

Referencing FIG. 6, upon receiving the DOMINATOR message from transceiver 5, transceivers 8, 9, 10 and 11 mark themselves gray and send out DOMINATEE messages; transceiver 12 remarks itself black and sends out a DOMINATOR message.

Figure 7:
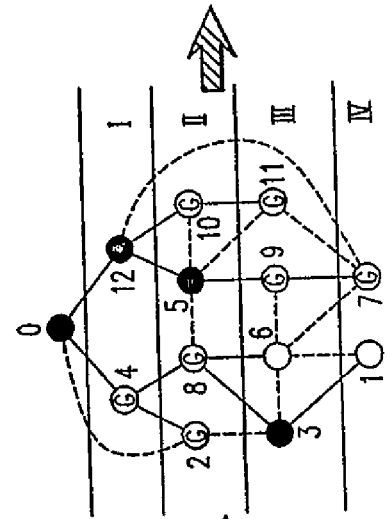

Referencing FIG. 7, upon receiving the DOMINATOR message from transceiver 12, transceiver 7 marks itself gray and sends out a DOMINATEE message. Upon receiving the DOMINATEE message from transceiver 8, transceiver 3 marks itself black as all its low-ranked neighbors (transceivers 2, 8) have been marked gray; transceiver 6 has to wait for transceiver 3.

Figure 8:
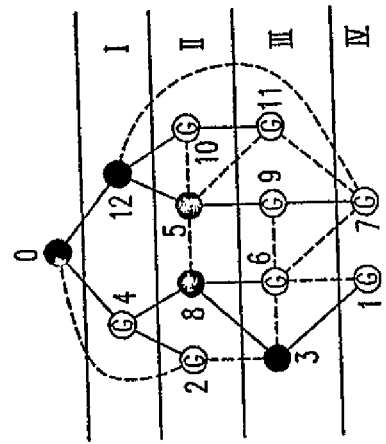

Referencing FIG. 8, upon receiving the DOMINATOR message from transceiver 3, transceivers 1 and 6 mark themselves gray and send out DOMINATEE messages; transceiver 8 remarks itself black and sends out a DOMINATOR message. Note that at the end of the last step, transceiver 4 will receive the DOMINATOR message from transceiver 8. But it will not remark its color from gray to black as transceiver 8 has sent a DOMINATEE message previously.

Thus at the completion of phase three of the algorithm, all transceivers in the network will be identified as a dominator or a dominatee. The backbone of the ad hoc wireless network is constructed of dominators, and each dominatee is a neighbor to a backbone transceiver.

Having thus described an algorithm for efficiently creating a message efficient virtual backbone in a wireless ad hoc network which can utilize optimally short message length and a minimal amount of message traffic; it will be appreciated that many variations thereon may occur to the artisan upon an understanding of the present invention, which is therefore to be limited only by the appended claims.

We claim:

1. A distributed algorithm on a computer readable medium for establishing a wireless ad hoc network backbone from a set of independent transceivers, each transceiver having an identifier and a broadcast range, and a transceiver neighbor or neighbors within its broadcast range with which it can communicate; comprising:

a) a leader election and tree construction phase wherein a spanning tree of transceivers is constructed with one transceiver being designated the root and with each transceiver establishing and recording its location in the tree and the identifiers of its neighbors, and ending with a report that the tree is established;

b) a level calculation phase whereby the root announces its level and the level increases for each transceiver as its distance from the root increases, with each transceiver recording the level of its neighbors, and whereby a precedence for each transceiver is established with consideration of each transceiver's level and identifier, with level being paramount in deciding precedence; and ending with a report that the levels of the tree are established; and c) a backbone construction phase wherein all transceivers start as neutral and are subsequently designated as a dominator or a dominatee, each transceiver sending one of two status messages: a dominator message or a dominatee message, each status message containing the sender's identifier; and starting with the root transceiver declaring itself a dominator when the tree and levels are established and sending a dominator message, all other transceivers subsequently acting according to the following principles:

i) a neutral transceiver receiving a dominator message for the first time shall mark itself a dominatee and broadcast a dominatee message, ii) a neutral transceiver receiving a dominatee message from each of its neighbors of a lower precedence shall mark itself a dominator and broadcast a dominator message;

iii) a dominatee transceiver receiving a dominator message from a child transceiver's first transmission shall remark itself black and broadcast a dominator message;

d) whereby when each transceiver is designated a dominator or a dominatee, the root transceiver is notified of completion of the ad hoc network backbone; and e) wherein each transceiver only needs to know the level and identifier information of its neighboring transceivers.

2. The distributed algorithm of claim 1 wherein all dominators are arranged as a contiguously linked backbone.

3. The distributed algorithm of claim 1 wherein all dominatees are arranged as neighbors to a dominator.

4. A distributed algorithm on a computer readable medium for establishing a wireless ad hoc network backbone from a set of independent transceivers, each transceiver having an identifier and a broadcast range, and a transceiver neighbor or neighbors within its broadcast range with which it can communicate; comprising:

a backbone construction phase wherein transceivers logically connected in a spanning tree structure start as neutral and are subsequently designated as a dominator or a dominatee, each transceiver sending one of two status messages: a dominator message or a dominatee message, each status message containing the sender's identifier; and starting with a first transceiver declaring itself a dominator and sending a dominator message, all other transceivers subsequently acting according to the following principles:

a) a neutral transceiver receiving a dominator message for the first time shall mark itself a dominatee and broadcast a dominatee message, b) a neutral transceiver receiving a dominatee message from each of its neighbors of lower precedence shall mark itself a dominator and broadcast a dominator message;

c) a dominatee transceiver receiving a dominator message for the first time from a child transceiver's first transmission shall remark itself a dominator and broadcast a dominator message.

5. The distributed algorithm of claim 4 wherein when each transceiver is designated a dominator or a dominatee, the root transceiver is notified of completion of the ad hoc network.

* * * * *

UNITED STATES PATENT AND TRADEMARK OFFICE
CERTIFICATE OF CORRECTION

PATENT NO. : 6,839,541 B2
APPLICATION NO. : 10/006943
DATED : January 4, 2005
INVENTOR(S) : Khaled Muhyeddin M. Alzoubi et al.

It is certified that error appears in the above-identified patent and that said Letters Patent is hereby corrected as shown below:

Replace Figures 1-8 with the attached formal drawings of Figures 1-8.

Signed and Sealed this

Sixth Day of February, 2007

JON W. DUDAS
*Director of the United States Patent and Trademark Office*